(12) United States Patent
Lim et al.

(10) Patent No.: US 11,199,303 B2
(45) Date of Patent: Dec. 14, 2021

(54) LIGHTING APPARATUS FOR VEHICLES

(71) Applicants: Hyundai Motor Company, Seoul (KR); Kia Motors Corporation, Seoul (KR); SL Corporation, Daegu (KR)

(72) Inventors: Jung Wook Lim, Seoul (KR); Byoung Suk Ahn, Gwacheon-si (KR); Ki Hong Lee, Seoul (KR); Seung Hyeok Chang, Suwon-si (KR); Jung Hee Seo, Gyeongsan-si (KR); Ji Yeon Kim, Gyeongsan-si (KR); Yoo Jin Son, Daegu (KR); Jong Young Kim, Daegu (KR); Jin Sik Nam, Gyeongsan-si (KR); Dong Hyun Go, Gyeongsan-si (KR); Mi Hyang Park, Daegu (KR)

(73) Assignees: Hyundai Motor Company, Seoul (KR); Kia Motors Corporation, Seoul (KR); SL Corporation, Daegu (KR)

( * ) Notice: Subject to any disclaimer, the term of this patent is extended or adjusted under 35 U.S.C. 154(b) by 0 days.

(21) Appl. No.: 16/787,466

(22) Filed: Feb. 11, 2020

(65) Prior Publication Data

US 2021/0033256 A1 Feb. 4, 2021

(30) Foreign Application Priority Data

Aug. 1, 2019 (KR) .......................... 10-2019-0093745

(51) Int. Cl.
*F21S 41/675* (2018.01)

(52) U.S. Cl.
CPC .................................. *F21S 41/675* (2018.01)

(58) Field of Classification Search
CPC .......... F21S 41/675; F21S 41/36; F21S 41/60; F21S 41/33; F21S 43/40; F21S 41/67; F21V 7/16; F21V 17/002; F21V 14/04
See application file for complete search history.

(56) References Cited

U.S. PATENT DOCUMENTS 6,457,849 B2 * 10/2002 Tsukamoto ........... F21S 41/675
362/509
6,921,188 B2 * 7/2005 Taniuchi ............... F21S 41/321
362/517

(Continued)

FOREIGN PATENT DOCUMENTS

DE 19806638 C2 * 12/1999 ............ F21S 41/675
EP 3094919 B1 3/2018
JP 2015-115276 A 6/2015

*Primary Examiner* — Tsion Tumebo
(74) *Attorney, Agent, or Firm* — Morgan, Lewis & Bockius LLP

(57) ABSTRACT

A lighting apparatus of vehicles may include a light source unit of emitting light; a first reflection unit of reflecting light incident from the light source unit to discharge the reflected light outside the first reflection unit; a second reflection unit rotatably provided between the light source unit and the first reflection unit to reflect light for allowing light emitted by the light source unit to move to the first reflection unit or blocking the light such that the light is not moved to the first reflection unit and reflecting the light at a position different from the first reflection unit to discharge the light outside depending on a rotational position of the second reflection unit; and a driving unit connected to the second reflection unit and configured of adjusting the rotational position of the second reflection unit.

13 Claims, 12 Drawing Sheets

(56) References Cited

U.S. PATENT DOCUMENTS

| | | | | |
|---|---|---|---|---|
| 7,008,094 | B2 * | 3/2006 | Taniuchi | B60Q 1/085 |
| | | | | 362/539 |
| 7,478,934 | B2 * | 1/2009 | Lee | F21S 41/321 |
| | | | | 362/538 |
| 7,484,864 | B2 * | 2/2009 | Okada | F21S 41/172 |
| | | | | 362/300 |
| 2002/0085387 | A1 * | 7/2002 | Taniuchi | F21S 41/695 |
| | | | | 362/538 |
| 2002/0089853 | A1 * | 7/2002 | Taniuchi | F21S 41/365 |
| | | | | 362/297 |
| 2003/0214474 | A1 * | 11/2003 | Aoki | G02B 27/01 |
| | | | | 345/87 |
| 2007/0236951 | A1 * | 10/2007 | Albou | F21S 41/151 |
| | | | | 362/507 |
| 2018/0009374 | A1 * | 1/2018 | Kim | G03B 21/2013 |
| 2018/0154819 | A1 * | 6/2018 | Hoshino | G02B 5/10 |
| 2020/0149702 | A1 * | 5/2020 | Takii | F21S 41/321 |

\* cited by examiner

LIGHTING APPARATUS FOR VEHICLES

CROSS-REFERENCE TO RELATED APPLICATION

The present application claims priority to Korean Patent Application No. 10-2019-0093745, filed on Aug. 1, 2019, the entire contents of which is incorporated herein for all purposes by this reference.

BACKGROUND OF THE INVENTION

Field of the Invention

The present invention relates to a lighting apparatus for vehicles capable of realizing various lamp functions using a single driving motor.

Description of Related Art

In general, a vehicle is provided with a lighting apparatus of clearly showing objects in the traveling direction during traveling at night or informing other vehicles or pedestrians of the traveling state thereof. A lamp referred to as a headlamp is a light having a function of illuminating a road ahead of a vehicle which is advancing.

Lamps are classified into a headlamp, a daytime running light, a fog lamp, a turn indicator, a brake light, and a reversing light, which are set to have different directions in which light is emitted to the surface of a road.

Since the lamps may emit beams having various functions, as described above, a plurality of parts is provided to perform lamp functions. That is, the lamp functions are individually performed, whereby the number of parts is increased and thus manufacturing cost is increased.

The information included in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a lighting apparatus of vehicles configured for realizing various lamp functions using a single driving motor, securing operation performance and reducing layout.

In accordance with an aspect of the present invention, the above and other objects may be accomplished by the provision of a lighting apparatus of vehicles, the lighting apparatus including a light source unit of emitting light, a first reflection unit of reflecting light incident from the light source unit to discharge the reflected light outside, a second reflection unit rotatably provided between the light source unit and the first reflection unit to reflect light for allowing light emitted by the light source unit to move to the first reflection unit or blocking the light such that the light is not moved to the first reflection unit and reflecting the light at a position different from the first reflection unit to discharge the light outside depending on the rotational position thereof, and a driving unit connected to the second reflection unit and configured of adjusting the rotational position of the second reflection unit.

The second reflection unit may be disposed to be rotatable in an axis, a first side of the second reflection unit configured for reflecting light together with the first reflection unit may be provided at one side of the axis, and a second side of the second reflection unit configured for reflecting light while blocking light moving to the first reflection unit may be provided at the other side of the axis.

The first reflection unit may be formed to have a curvature, and the first side of the second reflection unit may be formed to have a curvature identical to the curvature of the first reflection unit, the first side of the second reflection unit forming a parabola together with the first reflection unit when the first rotary reflection unit is located to face outside.

The second rotary reflection unit may have a reflective surface formed to have a curvature, and a plurality of optics may be formed on the reflective surface.

The driving unit may include a driving motor configured for transmitting rotational power, a cam unit coupled to the driving motor and configured to be rotated by the rotational power received from the driving motor such that the angle of the cam unit is changed, the external circumferential surface of the cam unit being curved, and a lever mechanism provided to be in contact with an external circumferential surface of the cam unit such that the lever mechanism is rotated while being pushed along the curved external circumferential surface when the cam unit is rotated, the lever mechanism being coupled to the second reflection unit such that the second reflection unit is rotated.

The cam unit may have a first driving sector formed on a portion of the external circumferential surface thereof and formed to form a circle about the rotation center, a second driving sector formed at one side of the first driving sector, forming a concentric circle together with the first driving sector, and having a diameter smaller than a diameter of the first driving sector, and a returning sector formed between the first driving sector and the second driving sector at the other side of the first driving sector, forming a concentric circle together with the first driving sector, and having a diameter smaller than a diameter of the second driving sector.

The cam unit may further have a switching sector formed to connect the first driving sector and the second driving sector while having a slope at the connection between the first driving sector and the second driving sector.

The lever mechanism may include a moving unit configured to be in contact with the external circumferential surface of the cam unit to move when the cam unit is rotated and a lever unit having one side to which the second reflection unit is coupled and the other side to which the moving unit is connected, the lever unit being configured to be rotated to rotate the second reflection unit.

The lighting apparatus may further include a mounting unit, in which the light source unit, the first reflection unit, the second reflection unit, and the driving unit are disposed, wherein a guide slot, through which the moving unit of the driving unit is slidably coupled and which extends along the radius of rotation of the lever unit, may be formed in the mounting unit.

A plurality of light source units, a plurality of first reflection units, a plurality of second reflection units, and a plurality of driving units may be provided to form a plurality of modules, and the cam units of the driving units of the modules may be connected to each other via a connection unit such that, when one of the cam units is rotated, the other cam units are also rotated.

The driving units may include a single driving motor, which is connected to one of the cam units.

A plurality of through-holes may be formed in each of the cam units, and a plurality of insertion protrusions, each of which is inserted into a corresponding one of the through-holes of each of the cam units, may be formed in the connection unit.

The through-holes may be formed in a section of each of the cam units to be spaced from each other in the circumferential direction thereof, and each of the insertion protrusions of the connection unit may be inserted into a corresponding one of the through-holes of each of the cam units, the insertion protrusions being sequentially inserted into through-holes disposed at different positions.

In accordance with another aspect of the present invention, there is provided a lighting apparatus of vehicles, the lighting apparatus including a plurality of modules, each of which includes a light source unit of emitting light, a first reflection unit of reflecting light incident from the light source unit to discharge the reflected light outside, a second reflection unit rotatably provided between the light source unit and the first reflection unit to reflect light for allowing light emitted by the light source unit to move to the first reflection unit or blocking the light such that the light is not moved to the first reflection unit and reflecting the light at a position different from the first reflection unit to discharge the light outside depending on the rotational position thereof, and a driving unit connected to the second reflection unit and configured of adjusting the rotational position of the second reflection unit, wherein the driving units of the modules are connected to each other via a connection unit such that the rotational positions of the second reflection units are simultaneously adjusted when one of the driving units is operated.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
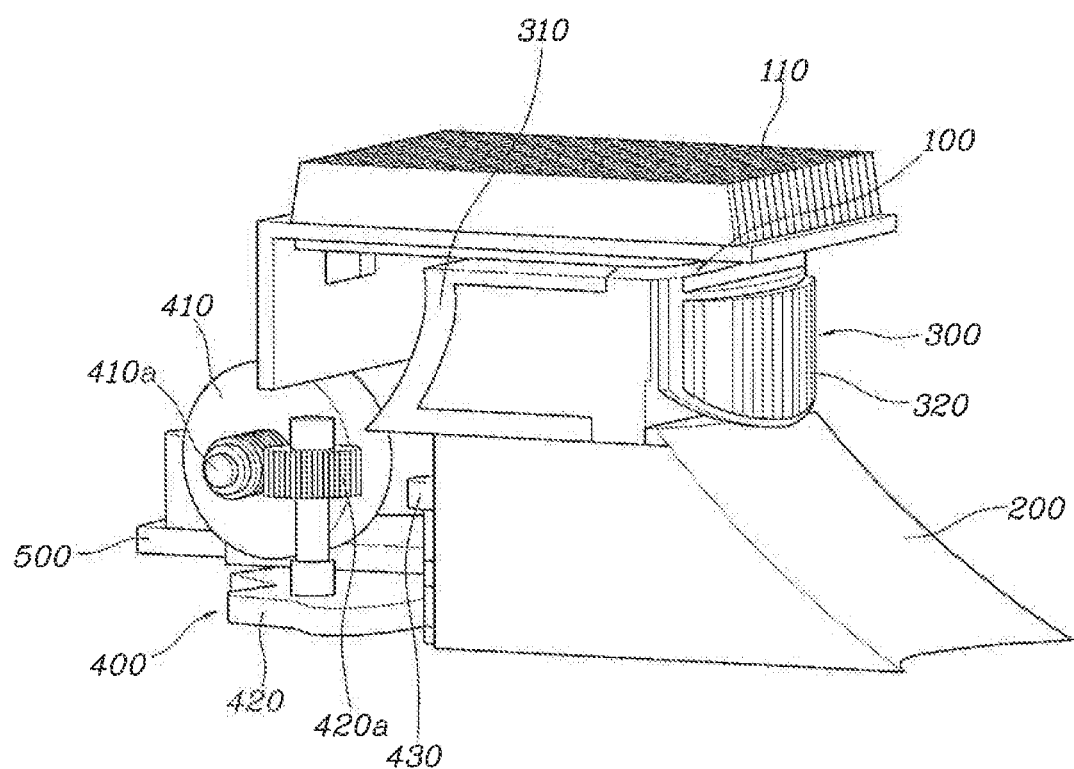
FIG. 1 is a view showing a lighting apparatus for vehicles according to an exemplary embodiment of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent portions of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other h, and the present invention(s) is/are intended to cover not only the exemplary embodiments of the present invention, but also various alternatives, modifications, equivalents and other embodiments, which may be included within the spirit and scope of the present invention as defined by the appended claims.

Hereinafter, a lighting apparatus of vehicles according to an exemplary embodiment of the present invention will be described with reference to the accompanying drawings.

Figure 2:
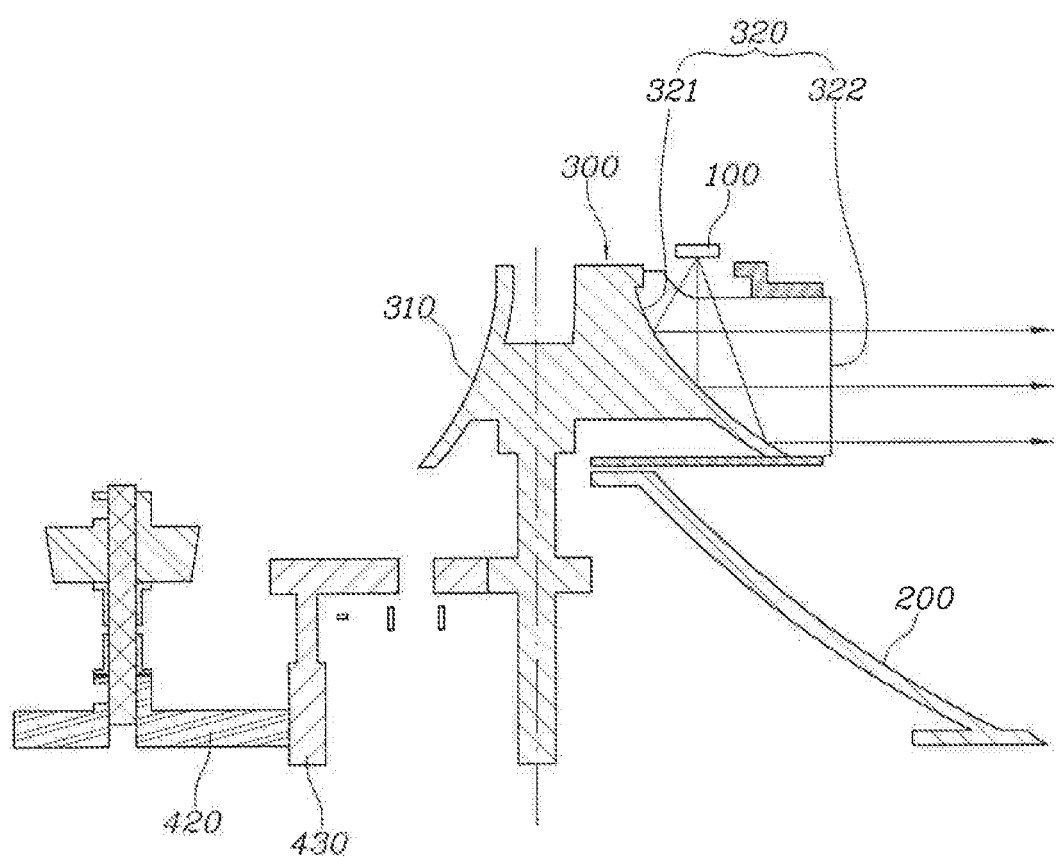
FIG. 2 is a sectional view of the lighting apparatus for vehicles shown in FIG. 1.
Figure 3:
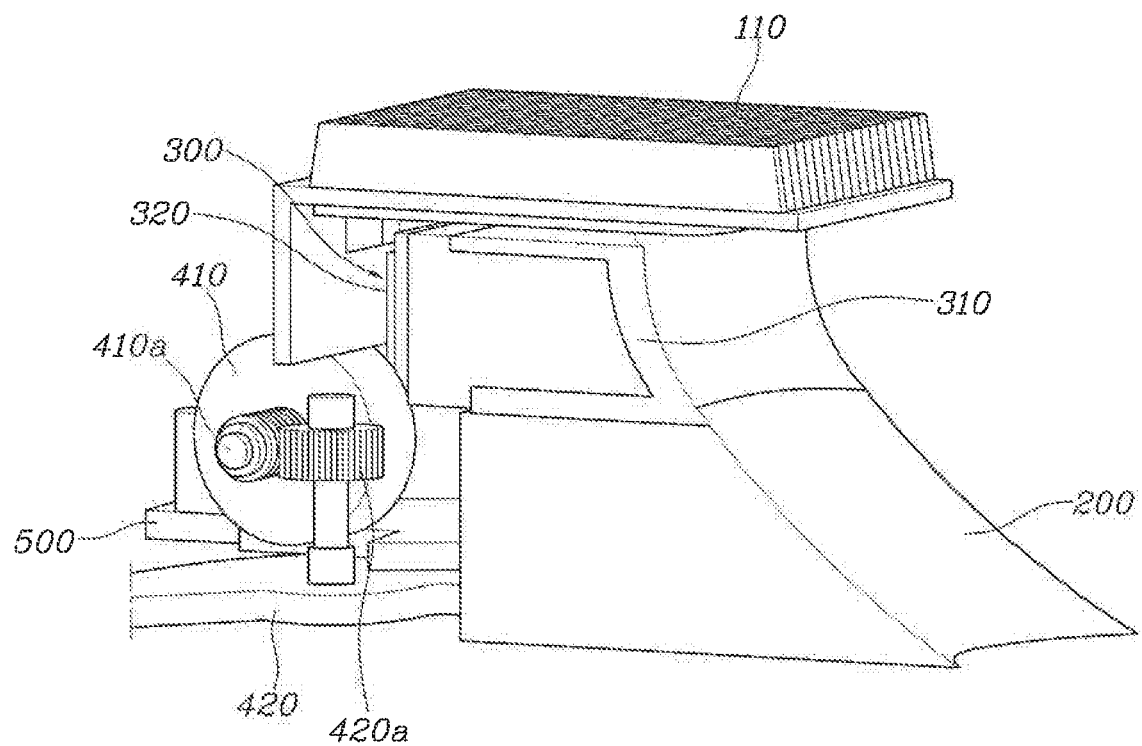
FIG. 3 is a view showing another function of the lighting apparatus for vehicles according to an exemplary embodiment of the present invention.
Figure 4:
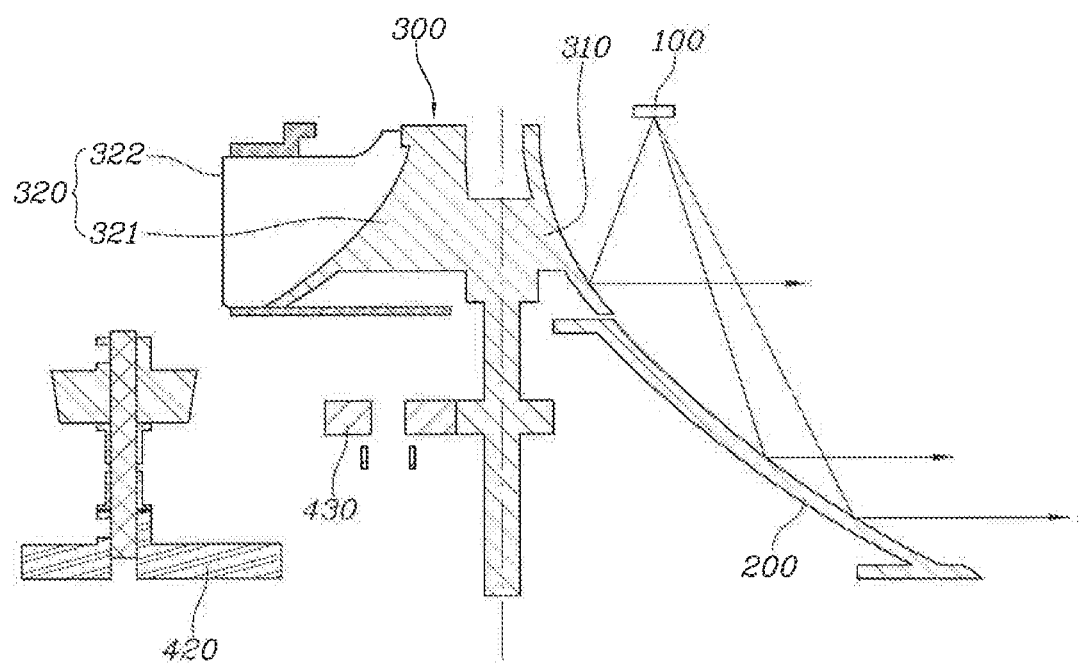
FIG. 4 is a sectional view of the lighting apparatus for vehicles shown in FIG. 1.
Figure 5:
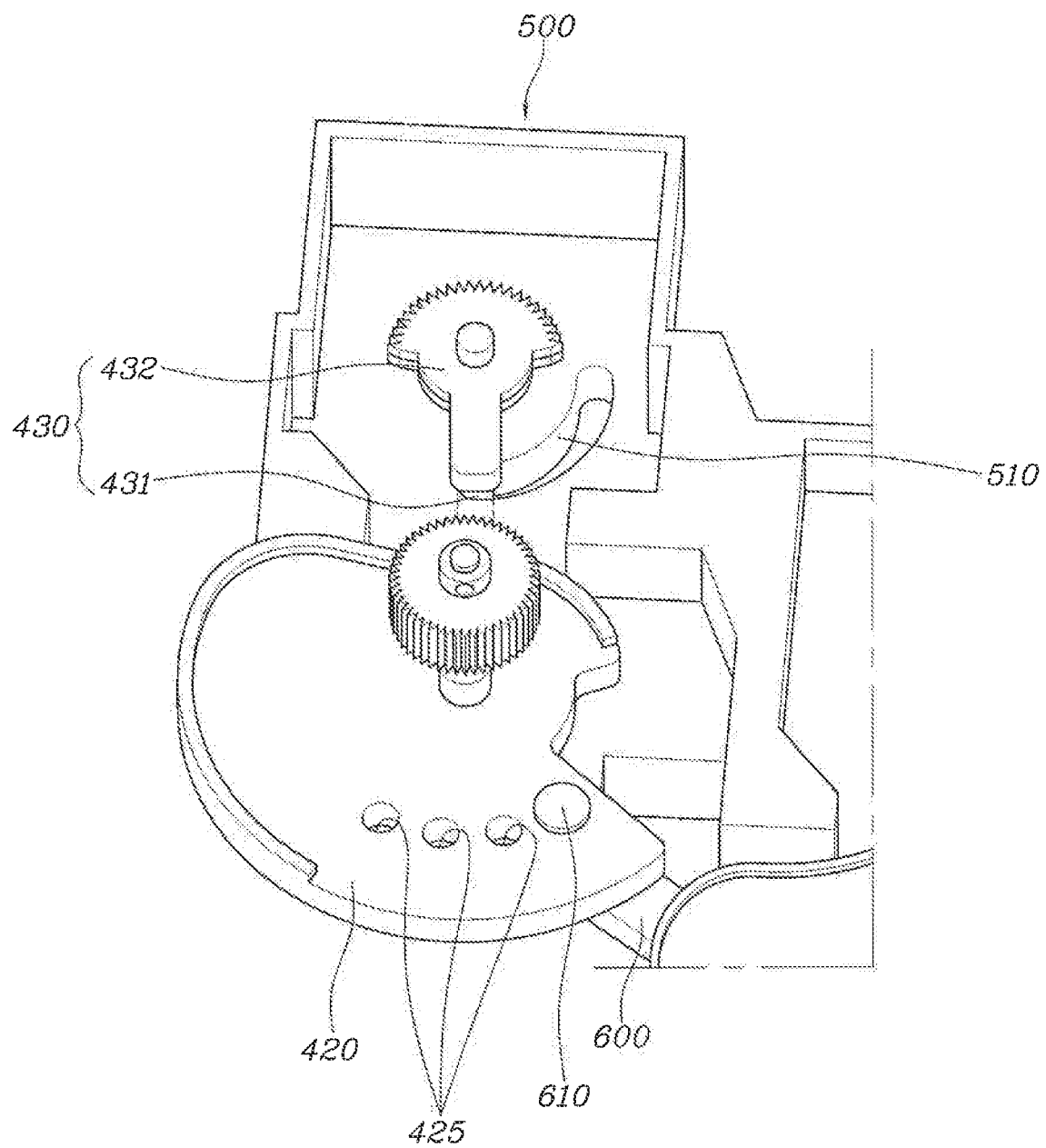
FIG. 5 and FIG. 6 are views illustrating a driving unit of the lighting apparatus for vehicles shown in FIG. 1.
Figure 6:
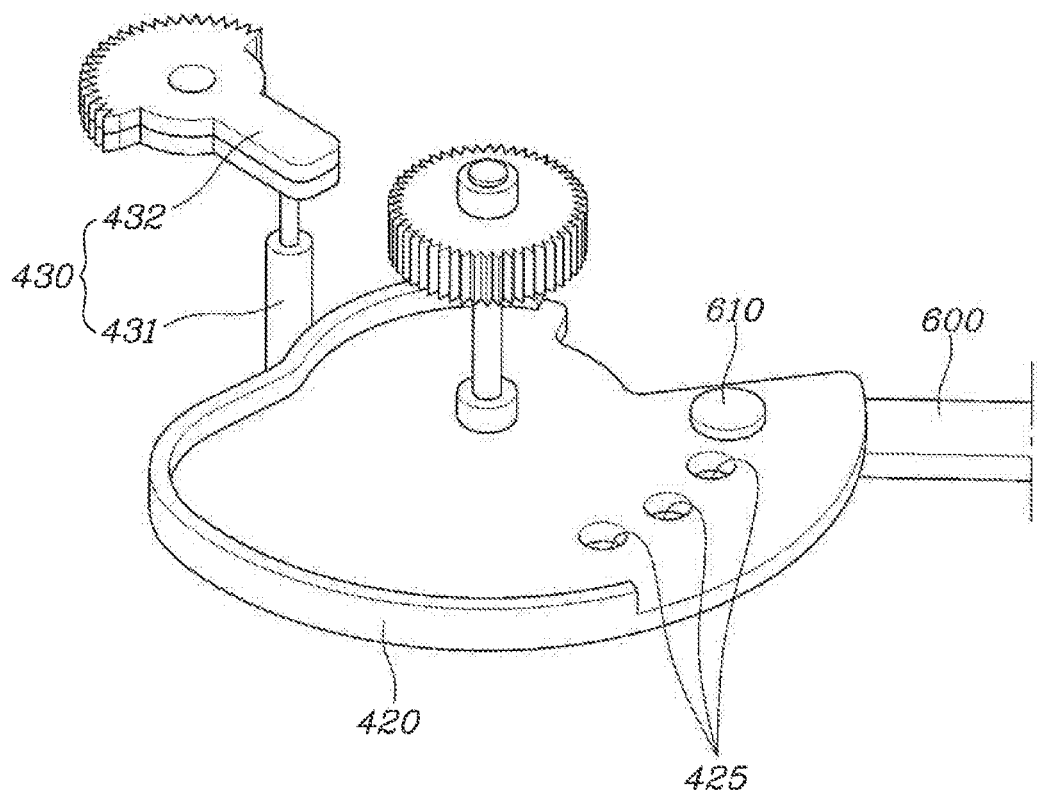
Figure 7:
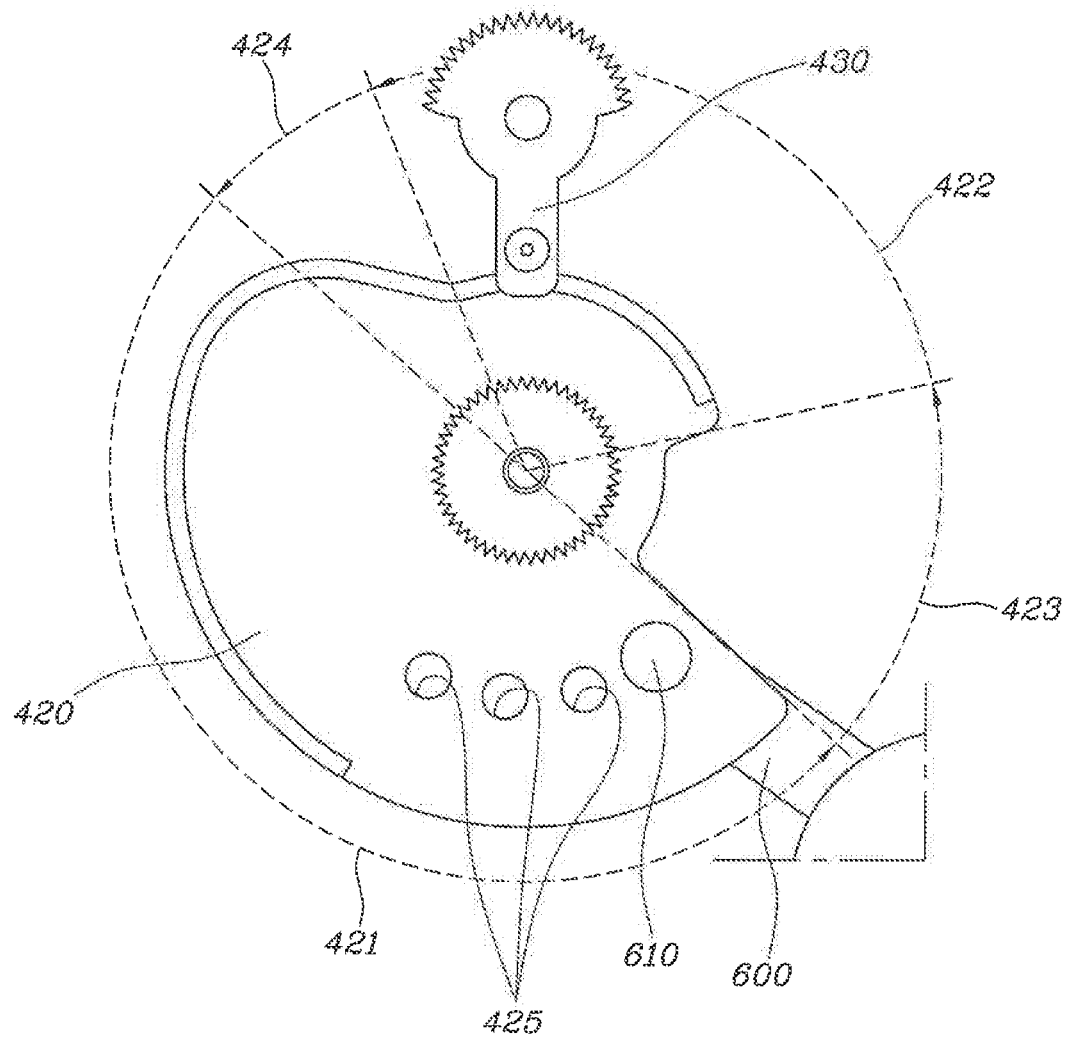
FIG. 7 and FIG. 8 are views illustrating a cam unit of the lighting apparatus for vehicles shown in FIG. 1.
Figure 8:
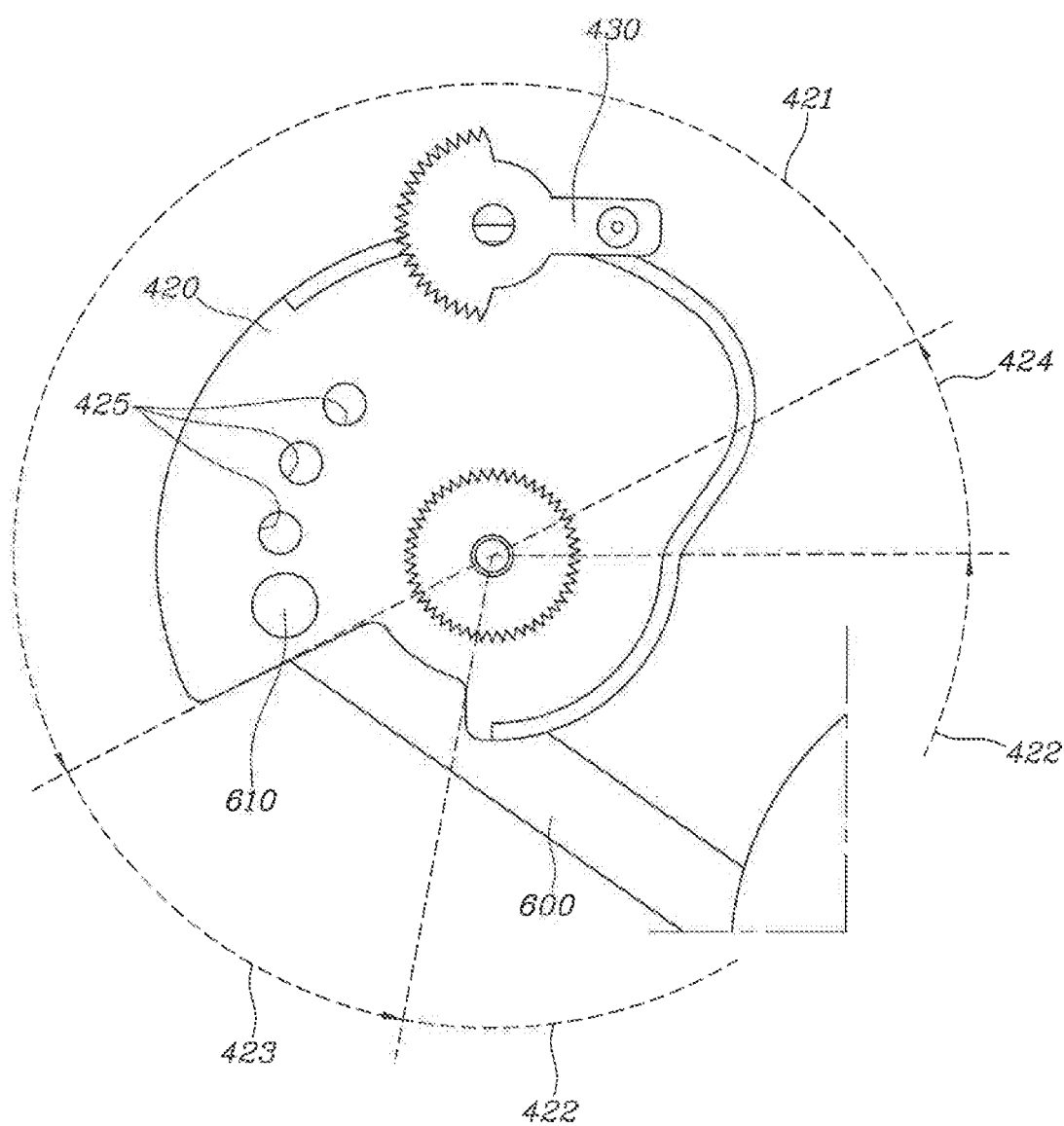

FIG. 1 is a view showing a lighting apparatus of vehicles according to an exemplary embodiment of the present invention, FIG. 2 is a sectional view of the lighting apparatus of vehicles shown in FIG. 1, FIG. 3 is a view showing another function of the lighting apparatus of vehicles according to an exemplary embodiment of the present invention, FIG. 4 is a sectional view of the lighting apparatus of vehicles shown in FIG. 1, FIG. 5 and FIG. 6 are views illustrating a driving unit of the lighting apparatus of vehicles shown in FIG. 1, FIG. 7 and FIG. 8 are views illustrating a cam unit of the lighting apparatus of vehicles shown in FIG. 1, and FIG. 9, FIG. 10, FIG. 11 and FIG. 12 are views illustrating that a plurality of cam units is operatively connected.

As shown in FIG. 1, FIG. 2, FIG. 3, and FIG. 4, the lighting apparatus of vehicles according to an exemplary embodiment of the present invention includes a light source unit 100 for emitting light, a first reflection unit 200 for reflecting light incident from the light source unit to discharge the reflected light to the outside, a second reflection unit 300 rotatably provided between the light source unit 100 and the first reflection unit 200 to reflect light for allowing light emitted by the light source unit to move to the first reflection unit 200 or blocking the light such that the light is not moved to the first reflection unit 200 and reflecting the light at a position different from the first reflection unit 200 to discharge the light to the outside depending on the rotational position thereof, and a driving unit 400 connected to the second reflection unit 300 for adjusting the rotational position of the second reflection unit 300.

In an exemplary embodiment of the present invention, the light source unit 100, the first reflection unit 200, and the second reflection unit 300 form a lamp module. The second reflection unit 300 is rotated by the driving unit 400, whereby the angle of the second reflection unit 300 is changed. As a result, the reflection position and reflection range of light emitted by the light source unit 100 are changed to realize various lamp functions.

The light source unit 100 may be constituted by an LED. Furthermore, a heat sink 110 may be provided to dissipate heat generated when the light source unit 100 emits light such that the light source unit 100 is cooled.

The first reflection unit 200 includes a reflection mirror for reflecting light incident from the light source unit 100. The first reflection unit 200 is formed to have a curvature such that the direction in which the incident light moves is changed and thus the light is discharged out of a vehicle.

The second reflection unit 300 is rotatably provided between the light source unit 100 and the first reflection unit 200, and the rotational position of the second reflection unit 200 is adjusted by the driving unit 400. The second reflection unit 300 allows the light emitted by the light source unit 100 to move to the first reflection unit 200, or blocks the movement of the light such that the light is reflected at a position different from the first reflection unit 200 depending on the rotational position thereof. That is, in the case in which the second reflection unit 300 allows the light emitted by the light source unit 100 to move to the first reflection unit 200, the light is reflected by the first reflection unit 200 and is then discharged to the outside, whereby a lamp function is realized. In the case in which the second reflection unit 300 blocks light moving to the first reflection unit 200, the light is reflected by the second reflection unit 300 and is then discharged to the outside, whereby another lamp function is realized.

In an exemplary embodiment of the present invention, as described above, it is possible to realize various lamp functions by adjusting the rotational position of the second reflection unit 300.

As shown in FIGS. 2 and 4, the second reflection unit 300 may be mounted to be rotatable in an axis, a side 310 of second reflection unit 300 for reflecting light together with the first reflection unit 200 may be provided at one side of the axis, and a side 320 of second reflection unit 300 for reflecting light while blocking light moving to the first reflection unit 200 may be provided at the other side of the axis.

The side 310 of second reflection unit 300 is formed such that, when the side 310 of second reflection unit 300 is located at the side of the first reflection unit 200 by a rotation of the second reflection unit 300, the side 310 of second reflection unit 300 reflects light together with the first reflection unit 200, whereby the side 310 of second reflection unit 300 and the first reflection unit 200 reflect light to be discharged to the outside.

The side 320 of second reflection unit 300 is formed such that, when the side 320 of second reflection unit 300 is located at the first reflection unit 200, the side 320 of second reflection unit 300 is located on a movement path of light emitted by the light source unit 100 to reflect light while blocking light moving to the first reflection unit 200, whereby the light is discharged out of the vehicle from a position at which the light is blocked.

The first reflection unit 200 is formed to have a curvature, and the side 310 of second reflection unit 300 is formed to have the same curvature as the first reflection unit 200. Furthermore, when the side 310 of second reflection unit 300 is located to face outside, the side 310 of second reflection unit 300 forms a parabola together with the first reflection unit 200.

As may be seen from FIG. 4, when the side 310 of the second reflection unit 300 is located at the side of the first reflection unit 200, the side 310 of second reflection unit 300 and the first reflection unit 200 have the same curvature and form a parabola, whereby light emitted by the light source unit 100 may be reflected by the side 310 of second reflection unit 300 and the first reflection unit 200 and may then be discharged to the outside.

The side 310 of second reflection unit 300 may include the same reflecting plate or mirror as the first reflection unit 200.

In the case in which the side 310 of second reflection unit 300 and the first reflection unit 200 form a single reflection form, as described above, it is possible to emit light over a wide range, whereby a headlamp function may be realized.

Meanwhile, the side 320 of second reflection unit 300 is formed such that, when the side 320 of second reflection unit 300 is located so as to face outside, the side 320 of second reflection unit 300 is located on the movement path of the light emitted by the light source unit 100 in order to block light moving to the first reflection unit 200 and to reflect the light at the position at which the light is blocked, whereby the light is discharged from the vehicle.

That is, the second reflection unit 300 is located between the light source unit 100 and the first reflection unit 200, and the side 320 of second reflection unit 300 is formed so as to be longer than the side 310 of second reflection unit 300, whereby the side 320 of second reflection unit 300 is located on the movement path of the light emitted by the light source unit 100 when the side 320 of second reflection unit 300 is located so as to face outside by rotation of the second reflection unit 300. Consequently, movement of the light emitted from the light source unit 100 to the first reflection unit 200 is blocked by the side 320 of second reflection unit 300 and, as the side 320 of second reflection unit 300 reflects the light, the movement path of the light is changed at the position at which movement of the light is blocked, whereby the light is discharged from the vehicle.

As a result, the side 320 of second reflection unit 300 constitutes a reflection form different from the reflection form constituted by the side 310 of second reflection unit 300 and the first reflection unit 200, whereby another lamp function may be realized. For example, a daytime running light (DRL) function may be realized.

The side 320 of second reflection unit 300 may have a reflective surface 321 formed so as to have curvature, whereby light reflected by the reflective surface 321 may be discharged from the vehicle. Here, the reflective surface 321 may be constituted by a reflecting plate or a mirror, and the side 320 of second reflection unit 300 may further include a lens 322 in order to improve efficiency of the light reflected by the reflective surface 321.

In addition, a plurality of optics may be formed on the reflective surface 321 of the side 320 of second reflection unit 300. That is, the side 320 of second reflection unit 300 may have a reflective surface 321 having curvature formed to discharge incident light to the outside, and a plurality of optics may be formed on the reflective surface 321 such that the light reflected by the reflective surface 321 is totally reflected and is then discharged to the outside.

The side 320 of second reflection unit 300 may have a narrower light discharge range than the side 310 of second reflection unit 300 and the first reflection unit 200, whereby a daytime running light (DRL) function may be realized. When the DRL function is performed, dimming may be performed such that the amount of light emitted by the light source unit 100 is reduced.

Meanwhile, as shown in FIG. 5 and FIG. 6, the driving unit 400 for adjusting the rotational position of the second reflection unit 300 includes a driving motor 410 for transmitting rotational power, a cam unit 420 configured to be rotated by the rotational power received from the driving motor 410 such that the angle of the cam unit is changed, the external circumferential surface of the cam unit 420 being curved, and a lever mechanism 430 provided to be in contact with the external circumferential surface of the cam unit 420 such that the lever mechanism 430 is rotated while being pushed along the curved external circumferential surface when the cam unit 420 is rotated, the lever mechanism 430 being coupled to the second reflection unit 300 such that the second reflection unit 300 is rotated.

The driving motor 410 may have a motor rotatable in the forward and reverse directions, and the cam unit 420 is connected to the driving motor 410 to be rotated by the rotational power received from the driving motor 410. The lever mechanism 430 is provided to be in contact with the cam unit 420, which is rotated by the operation of the driving motor 410, and the second reflection unit 300 is coupled to the lever mechanism 430. When the driving motor 410 is operated, therefore, the lever mechanism 430 is rotated with the cam unit 420, whereby the rotational angle of the second reflection unit 300 may be adjusted.

As shown in FIG. 1, the driving motor 410 may be provided with a screw 410a, and the cam unit 420 may be provided with a cam gear 420a, which engages with the screw 410a, whereby rotational power may be transmitted through engagement therebetween.

Furthermore, as shown in FIG. 6, the lever mechanism 430 may include a moving unit 431 configured to be in contact with the external circumferential surface of the cam unit 420 to move when the cam unit 420 is rotated and a lever unit 432 having one side to which the second reflection unit 300 is coupled and the other side to which the moving unit 431 is connected, the lever unit 432 being configured to be rotated to rotate the second reflection unit 300.

As described above, the lever mechanism 430 includes the moving unit 431 and the lever unit 432, the moving unit 431 is formed in the shape of a bar that contacts with the external circumferential surface of the earn unit 420, and the lever unit 432 is coupled to the moving unit 431 to be rotated according to the movement of the moving unit 431. The lever unit 432 and the second reflection unit 300 may be rotatably coupled to each other. As shown in FIG. 1, a lever gear 432a is provided at one side of the lever unit 432, and a corresponding gear 300a, which engages with the lever gear 432a, is provided at the second reflection unit 300, whereby the second reflection unit 300 may be rotated through engagement between the gears when the lever unit 432 is rotated.

When the cam unit 420 is rotated, therefore, the moving unit 431 of the lever mechanism 430 moves along the curved surface of the cam unit 420, and the lever unit 432 is rotated to rotate the second reflection unit 300 according to the movement of the moving unit 431. Consequently, it is possible to change lamp functions depending on the rotational position of the second reflection unit 300.

The cam unit 420 will be described in detail. As shown in FIGS. 7 and 8, the cam unit 420 may have a first driving sector 421 formed on a portion of the external circumferential surface thereof and formed to form a circle about the rotation center, a second driving sector 422 formed at one side of the first driving sector 421, forming a concentric circle together with the first driving sector 421, and having a diameter smaller than a diameter of the first driving sector 421, and a returning sector 423 formed between the first driving sector 421 and the second driving sector 422 at the other side of the first driving sector 421, forming a concentric circle together with the first driving sector 421, and having a diameter smaller than a diameter of the second driving sector 422.

That is, the external circumferential surface of the cam unit 420 is curved, and the lever mechanism 430 moves along the curved surface of the cam unit 420, whereby the rotational position of the lever mechanism 430 is changed. To the present end portion, the first driving sector 421, the second driving sector 422, and the returning sector 423, which have different diameters, are formed on the external circumferential surface of the cam unit 420. Consequently, the lever mechanism 430 contacts with a specific one of the sectors, whereby the rotational position of the lever mechanism 430 may be changed.

As shown in FIGS. 7 and 8, the lever mechanism 430 is provided to be in contact with the external circumferential surface of the cam unit 420. In an example, as shown in FIG. 7, when the lever mechanism 430 contacts with the second driving sector 422 of the external circumferential surface of the cam unit 420, the rotational angle of the cam unit 420 is 0 degrees, i.e., the lever mechanism 430 is not rotated. Consequently, the second rotary reflection unit 320 of the second reflection unit 300 is located at the side of the first reflection unit 200, whereby a DRL function may be performed.

When the driving unit 400 is operated to rotate the cam unit 420 in the present state, as shown in FIG. 8, the lever mechanism 430 contacts with the first driving sector 421 of the cam unit 420. At the instant time, the lever mechanism 430 enters the first driving sector 421 of the cam unit 420 and is thus rotated, since the diameter of the first driving sector 421 is greater than the diameter of the second driving sector 422 of the earn unit 420, and the second reflection unit 300, which is coupled to the lever mechanism 430, is also rotated, whereby the first rotary reflection unit 310 is located at the side of the first reflection unit 200. Consequently, a headlamp function may be performed.

The earn unit 420 further has a switching sector 424 formed to extend while having a slope at the connection between the first driving sector 421 and the second driving sector 422. Consequently, the lever mechanism 430 may smoothly move from the first driving sector 421 to the second driving sector 422 along the slope of the switching sector 424.

Furthermore, since the returning sector 423, which is formed between the first driving sector 421 and the second driving sector 422 at the other side of the first driving sector 421, forms a concentric circle together with the first driving sector 421, and has a smaller diameter than the second driving sector 422, is formed at the cam unit 420, the lever mechanism 430 may be switched to the state in which the lever mechanism 430 can enter the second driving sector 422 from the first driving sector 421.

As a result, the rotational angle of the lever mechanism 430 may be changed by a rotation of the cam unit 420, whereby the rotational position of the second reflection unit 300 may be changed.

Meanwhile, as shown in FIG. 5, a mounting unit 500, in which the light source unit 100, the first reflection unit 200, the second reflection unit 300, and the driving unit 400 are installed, is further included. The mounting unit 500 may be a lamp case, which is fixed to a vehicle body, and a guide slot 510, through which the moving unit 431 of the driving unit 400 extends and which extends along the radius of rotation of the lever unit 432, may be formed in the mounting unit 500.

That is, the lever mechanism 430 may include the moving unit 431 and the lever unit 432, and when the cam unit 420 is rotated in the state in which the moving unit 431 is fitted in the guide slot 510, the moving unit 431 moves along the guide slot 510, whereby the lever unit 432 may be accurately rotated at a predetermined radius of rotation. That is, the lever mechanism 430 is mounted at the mounting unit 500 to be rotatable in an axis, and the moving unit 431 moves along the guide slot 510, whereby the rotational position of the second reflection unit 300, which is coupled to the lever unit 432, may be accurately moved to a predetermined position.

Meanwhile, a plurality of light source units 100, a plurality of first reflection units 200, a plurality of second reflection units 300, and a plurality of driving units 400 may be provided to form a plurality of modules. The cam units 420 of the driving units 400 of the modules may be connected to each other via a connection unit 600 such that, when one of the cam units 420 is rotated, the other cam units 420 are also rotated. To the present end portion, the modules may be mounted in a straight line, and the connection unit 600 may extend in a straight line to be connected to the cam units 420 of the modules.

As described above, a plurality of light source units 100, a plurality of first reflection units 200, a plurality of second reflection units 300, and a plurality of driving units 400 may be provided to form a plurality of modules, and the cam units 420 of the modules are operatively connected to each other via the connection unit 600. When one of the cam units 420 is rotated using a single driving motor 410, therefore, the other cam units 420 may be rotated simultaneously.

That is, the driving units 400 include a single driving motor 410, which is connected to one of the earn units 410. Even when the driving motor 410 is operated to rotate one of the cam units 410, therefore, all of the cam units 420 of the modules may be rotated at the same rotation speed, since the cam units 420 are connected to each other via the connection unit 600.

A plurality of through-holes 425 is formed in each cam unit 420, and a plurality of insertion protrusions 610, each of which is inserted into a corresponding one of the through-holes 425 of each cam unit 420, is formed in the connection unit 600, whereby a plurality of cam units 420 may be connected to a single connection unit 600. Furthermore, the insertion protrusions 610 are rotatably inserted into the through-holes 425, whereby the cam units 420 and the connection unit 600 are smoothly rotated relative to each other.

Figure 9:
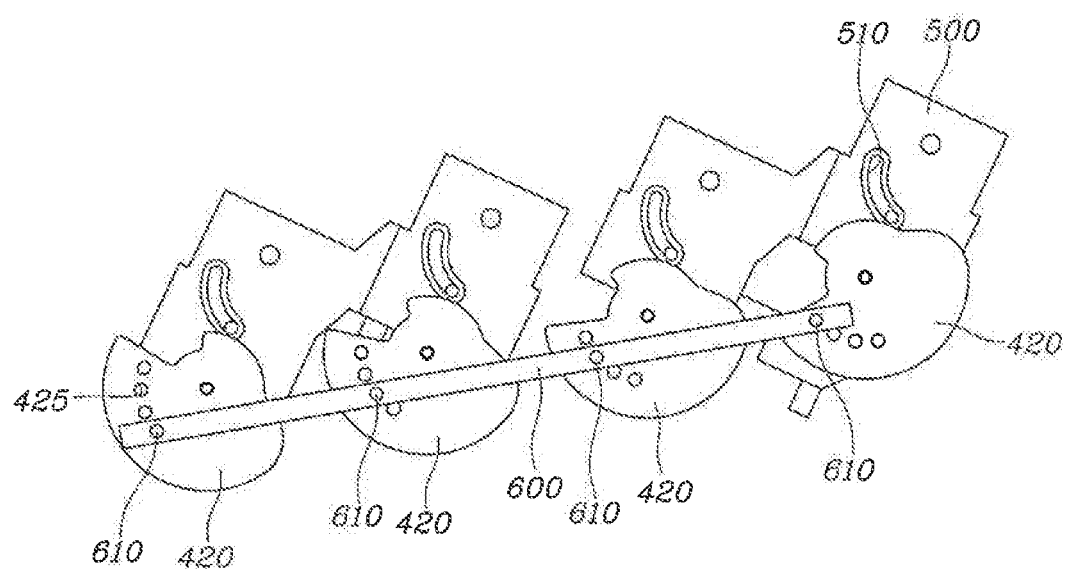
FIG. 9, FIG. 10, FIG. 11 and FIG. 12 are views illustrating that a plurality of cam units is operatively connected.

Meanwhile, as shown in FIG. 9, a plurality of through-holes 425 may be formed in the section of each cam unit 420 to be spaced from each other in the circumferential direction thereof, and each insertion protrusion 610 of the connection unit 600 may be inserted into a corresponding one of the through-holes 425 of each cam unit 420. Here, the insertion protrusions 610 may be sequentially inserted into through-holes 425 disposed at different positions.

In the state in which the modules are mounted, the insertion protrusions 610 of the connection unit 600, which is connected to the cam unit 420 of each module, are inserted into different through-holes 425, whereby the second reflection units 300 may be sequentially rotated when the cam units 420 are rotated, That is, since the cam units 420 of the modules are mounted to have different mounting angles, the lever mechanisms 430, which contact with the cam units 420, are sequentially rotated when the driving unit 400 is operated, and the second reflection units 300, which are coupled to the lever mechanisms 430, are also sequentially rotated, whereby a sequential lighting effect is achieved.

Figure 10:
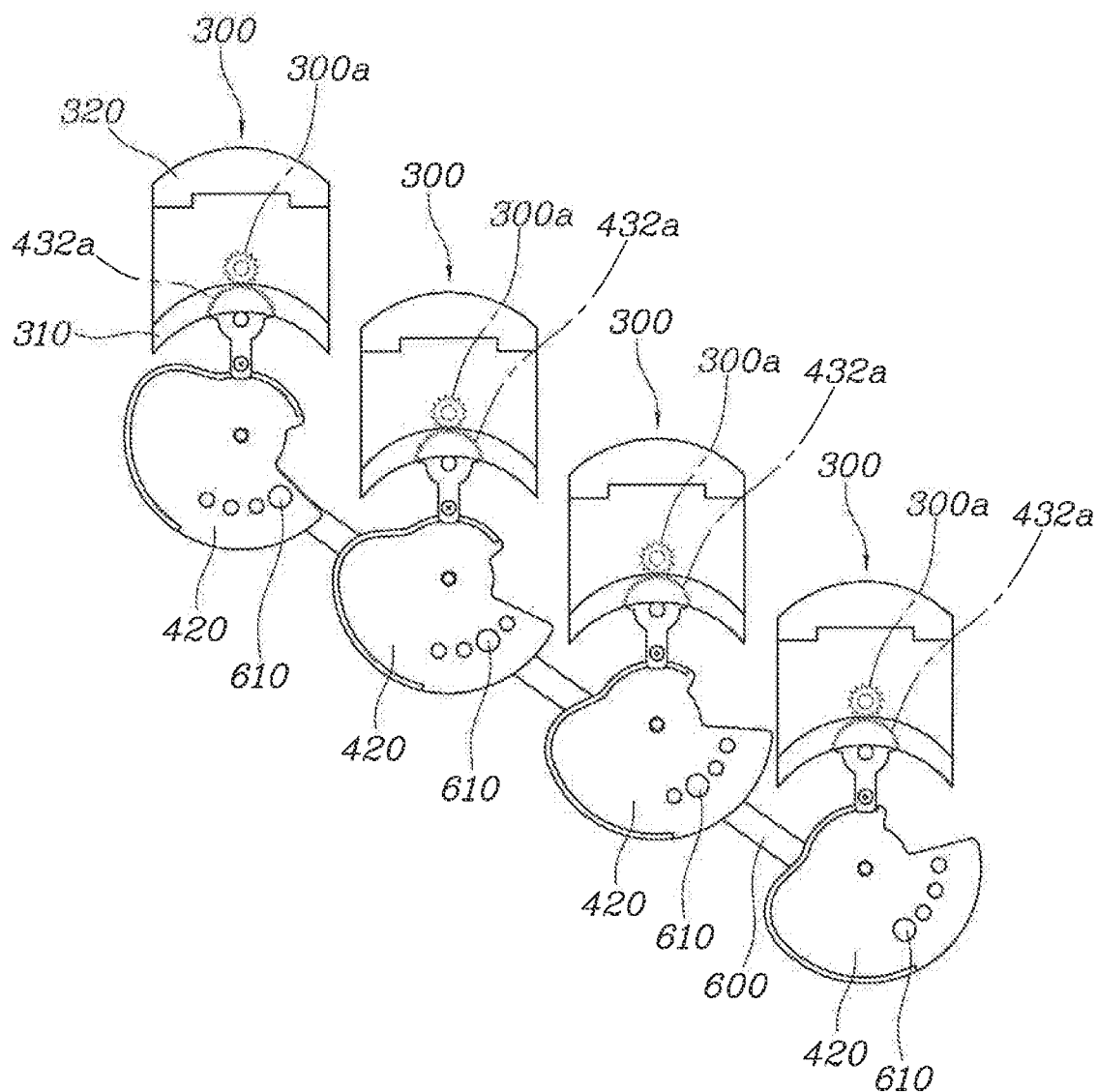
Figure 11:
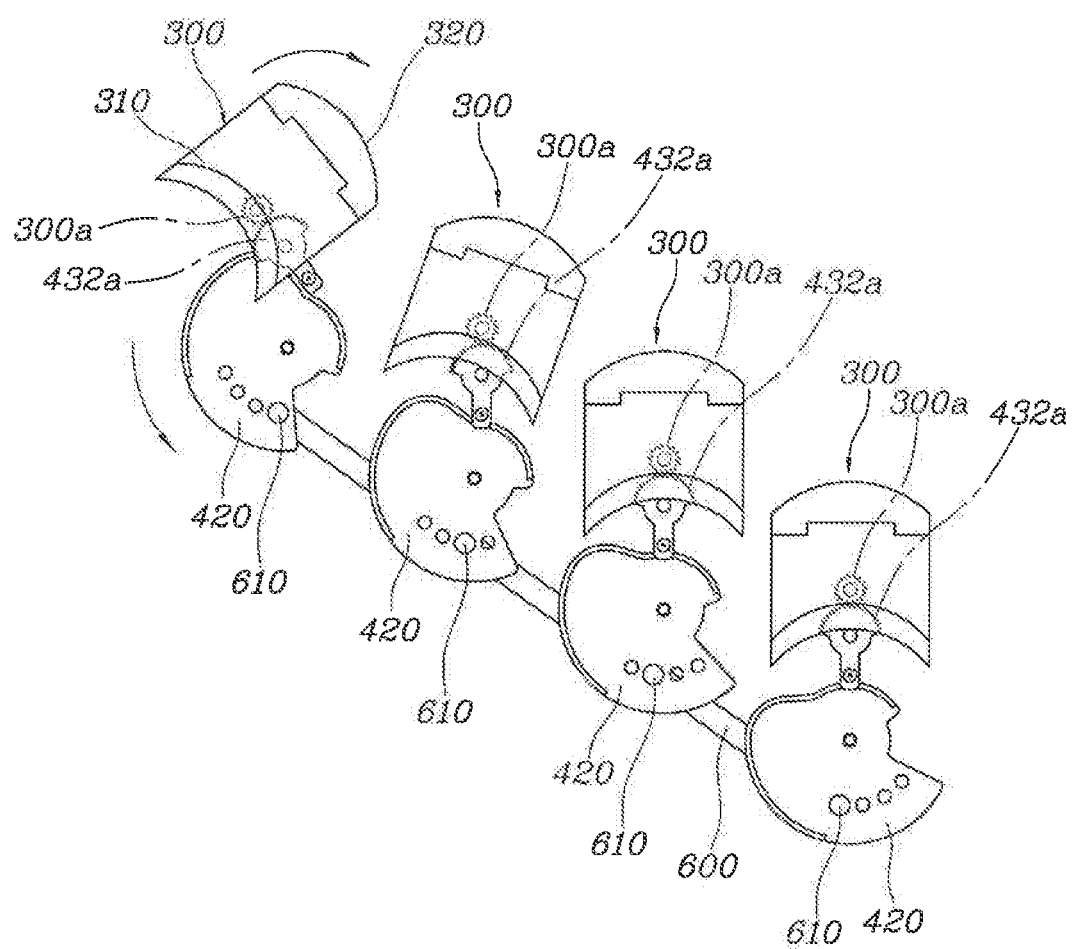

That is, as shown in FIG. 10, the second rotary reflection units 320 of the second reflection units 300 are located at the side of the first reflection units 200, whereby a headlamp function is realized, and when one of the cam units 420, which is connected to the single driving motor 410, is rotated, the cam units 420 of the modules, which are connected to each other via the connection unit 600, are rotated simultaneously. As shown in FIG. 11, even when the cam units 420 of the modules are rotated simultaneously, some of the second reflection units 300 are rotated and some other of the second reflection units 300 are located at the side of the first reflection units 200, since each level mechanism 430 is located at the first driving sector 421 or the second driving sector 422 of a corresponding one of the cam units 420. Furthermore, the second reflection units 300 of the modules are sequentially rotated, whereby sequential lighting is realized.

Figure 12:
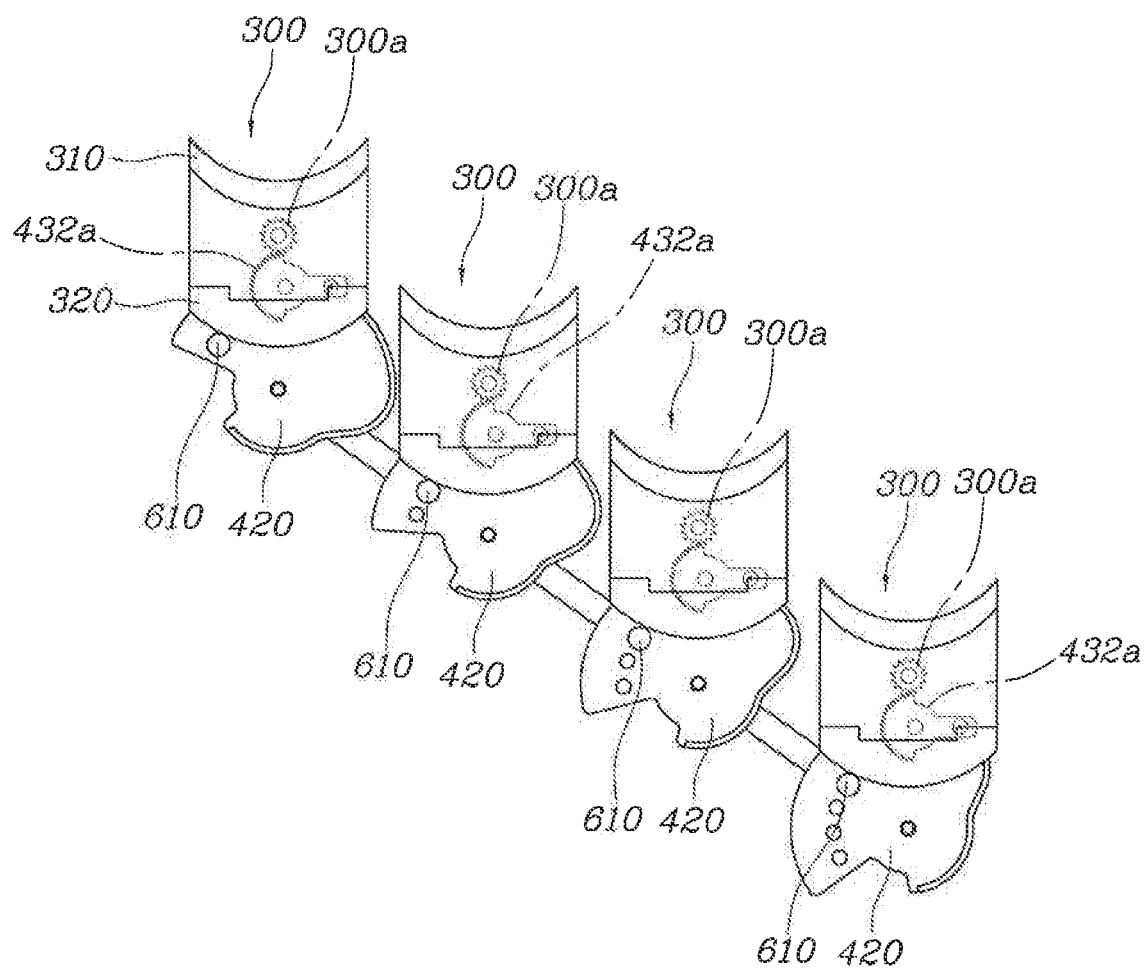

Furthermore, as shown in FIG. 12, the second reflection units 300 are rotated by a rotation of the cam units 420, and the first rotary reflection units 310 are located at the side of the first reflection units 200, whereby a DRL function is realized.

In the lighting apparatus of vehicles configured to have the structure described above, a plurality of cams is linked to each other to be operated together, and the cams are rotated using a single driving motor 410, whereby various lamp functions are realized. Furthermore, the cams are commonly used, operation performance is secured, and layout is reduced.

Meanwhile, the lighting apparatus of vehicles according to an exemplary embodiment of the present invention includes a plurality of modules, each of which includes a light source unit 100 for emitting light, a first reflection unit 200 for reflecting light incident from the light source unit to discharge the reflected light to the outside, a second reflection unit 300 rotatably provided between the light source unit 100 and the first reflection unit 200 to reflect light for allowing light emitted by the light source unit to move to the first reflection unit 200 or blocking the light such that the light is not moved to the first reflection unit 200 and reflecting the light at a position different from the first reflection unit 200 to discharge the light to the outside depending on the rotational position thereof, and a driving unit 400 connected to the second reflection unit 300 for adjusting the rotational position of the second reflection unit 300, wherein the driving units 400 of the modules are connected to each other via a connection unit 600, whereby the rotational positions of the second reflection units 300 are simultaneously adjusted when one of the driving units 400 is operated.

As described above, a plurality of light source units 100, a plurality of first reflection units 200, a plurality of second reflection units 300, and a plurality of driving units 400 may be provided to form a plurality of modules, and the driving unit 400 of the modules are operatively connected to each other via the connection unit 600. When one of the driving units 400 is operated, therefore, the other driving unit 400 may be rotated simultaneously, whereby the rotational positions of the second reflection units 300 are adjusted.

The second reflection units 300 allow the light emitted by the light source units 100 to move to the first reflection units 200, or block the movement of the light such that the light is reflected at positions different from the first reflection units 200 depending on the rotational positions thereof. That is, in the case in which the second reflection units 300 allow the light emitted by the light source units 100 to move to the first reflection units 200, the light is reflected by the first reflection units 200 and is then discharged to the outside, whereby a lamp function is realized. In the case in which the second reflection units 300 block light moving to the first reflection units 200, the light is reflected by the second reflection units 300 and is then discharged to the outside, whereby another lamp function is realized.

That is, since the modules are driven simultaneously using only a single driving unit 400, the rotational positions of the second reflection units 300 of the modules are adjusted by the single driving unit 400, whereby operation performance is secured, layout is reduced, and various lamp functions are realized.

As is apparent from the above description, in the lighting apparatus of vehicles configured to have the structure described above, a plurality of cams is linked to each other to be operated together, and the cams are rotated using a single driving motor, whereby various lamp functions are realized. Furthermore, the cams are commonly used, operation performance is secured, and layout is reduced.

For convenience in explanation and accurate definition in the appended claims, the terms "upper", "lower", "inner", "outer", "up", "down", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A lighting apparatus including:
   a light source unit of emitting light;
   a first reflection unit of reflecting light incident from the light source unit to discharge the reflected light outside the first reflection unit;
   a second reflection unit rotatably mounted between the light source unit and the first reflection unit to reflect light and configured for allowing light emitted by the light source unit to move to the first reflection unit or blocking the light such that the light is not moved to the first reflection unit and for reflecting the light at a position different from the first reflection unit to discharge the light outside depending on a rotational position of the second reflection unit; and
   a driving unit connected to the second reflection unit and configured of adjusting the rotational position of the second reflection unit,
   wherein the second reflection unit is mounted to be rotatable in an axis,
   wherein a first side of the second reflection unit configured for reflecting light with the first reflection unit is provided at a first side of the axis,
   wherein a second side of the second reflection unit configured for reflecting light while blocking light moving to the first reflection unit is provided at a second side of the axis,
   wherein the first reflection unit is formed to have a curvature, and
   wherein the first side of the second reflection unit is formed to have a curvature identical to the curvature of the first reflection unit, the first side of the second reflection unit forming a parabola with the first reflection unit while the first side of the second reflection unit is located to face outside.

2. The lighting apparatus according to claim 1, wherein the second side of the second reflection unit is formed such that, when the second side of the second reflection unit is located so as to face outside, the second side of the second reflection unit is located on a movement path of the light emitted by the light source unit in order to block light moving to the first reflection unit, whereby the light is discharged from a vehicle from a position at which the light is blocked.

3. The lighting apparatus according to claim 2, wherein the second side of the second reflection unit has a reflective surface formed so as to have curvature, whereby light reflected by the reflective surface is discharged from the vehicle.

4. The lighting apparatus according to claim 3, wherein a plurality of optics is formed on the reflective surface of the second side of the second reflection unit.

5. The lighting apparatus according to claim 1, wherein the driving unit includes:
   a driving motor configured for transmitting rotational power;
   a cam unit coupled to the driving motor and configured to be rotated by the rotational power received from the driving motor such that an angle of the cam unit is adjusted, an external circumferential surface of the cam unit being curved; and
   a lever mechanism provided to be in contact with the external circumferential surface of the cam unit such that the lever mechanism is rotated while being pushed along the curved external circumferential surface when the cam unit is rotated,
   wherein the lever mechanism is coupled to the second reflection unit and the second reflection unit is rotated by the lever mechanism.

6. The lighting apparatus according to claim 5, wherein the cam unit includes:
   a first driving sector formed on a portion of the external circumferential surface of the cam unit and formed to form an imaginary circle about a rotation center of the cam unit;
   a second driving sector formed at a first side of the first driving sector, forming an imaginary concentric circle with the first driving sector, and having a diameter smaller than a diameter of the first driving sector; and
   a returning sector formed between the first driving sector and the second driving sector at a second side of the first driving sector, forming an imaginary concentric circle with the first driving sector, and having a diameter smaller than the diameter of the second driving sector.

7. The lighting apparatus according to claim 6, wherein the cam unit further has a switching sector formed to connect the first driving sector and the second driving sector while having a slope at a connection between the first driving sector and the second driving sector.

8. The lighting apparatus according to claim 5, wherein the lever mechanism includes:
   a moving unit configured to be in contact with the external circumferential surface of the cam unit to move along the moving unit when the cam unit is rotated; and
   a lever unit having a first side to which the second reflection unit is coupled and a second side to which the moving unit is connected, the lever unit being configured to be rotated to rotate the second reflection unit.

9. The lighting apparatus according to claim 8, further including:
- a mounting unit, in which the light source unit, the first reflection unit, the second reflection unit, and the driving unit are mounted,
- wherein a guide slot, through which the moving unit of the driving unit is slidably coupled and which extends along a radius of rotation of the lever unit, is formed in the mounting unit.

10. The lighting apparatus according to claim 5,
- wherein a plurality of light source units, a plurality of first reflection units, a plurality of second reflection units, and a plurality of driving units are provided to form a plurality of modules, and
- wherein cam units of the plurality of driving units of the plurality of modules are connected to each other via a connection unit such that, when one of the cam units is rotated, another remaining cam units among the cam units are rotated by the connection unit.

11. The lighting apparatus according to claim 10, wherein the plurality of driving units include a single driving motor, which is connected to one of the cam units.

12. The lighting apparatus according to claim 10,
- wherein a plurality of through-holes is formed in each of the cam units, and
- wherein a plurality of insertion protrusions, each of which is inserted into a corresponding one of the plurality of through-holes in each of the cam units, is formed in the connection unit.

13. The lighting apparatus according to claim 12,
- wherein the plurality of through-holes are formed in a section of each of the cam units to be spaced from each other in a circumferential direction of each of the cam units, and
- wherein each of the insertion protrusions of the connection unit is inserted into a corresponding one of the plurality of through-holes of each of the cam units, the insertion protrusions being sequentially inserted into the through-holes mounted at different positions.

* * * * *